(12) United States Patent
Gangwar et al.

(10) Patent No.: US 12,517,931 B2
(45) Date of Patent: Jan. 6, 2026

(54) SYSTEM AND METHOD FOR SELF-GENERATED ENTITY-SPECIFIC BOT

(71) Applicant: JIO PLATFORMS LIMITED, Gujarat (IN)

(72) Inventors: Gaurav Gangwar, Pilibhit (IN); Pankaj Shinde, Sangamner (IN); Jagdish Kudva, Dombivli East (IN); Supreem Mishra, Lucknow (IN); Abhishek Farkade, Pune (IN); Gaurav Duggal, Hyderabad (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 436 days.

(21) Appl. No.: 17/646,448

(22) Filed: Dec. 29, 2021

(65) Prior Publication Data

US 2022/0207066 A1 Jun. 30, 2022

(30) Foreign Application Priority Data

Dec. 29, 2020 (IN) .............................. 202021056951

(51) Int. Cl.
*G06F 16/3329* (2025.01)
*G06F 16/3332* (2025.01)
(Continued)

(52) U.S. Cl.
CPC ...... *G06F 16/3329* (2019.01); *G06F 16/3335* (2019.01); *G06F 40/30* (2020.01);
(Continued)

(58) Field of Classification Search
CPC .. G06F 16/3329; G06F 16/3335; G06F 40/30; G06N 20/20; G06N 3/044; G06N 5/022
See application file for complete search history.

(56) References Cited

U.S. PATENT DOCUMENTS 11,176,484 B1 * 11/2021 Dorner .................. G06F 16/738
2004/0215663 A1 * 10/2004 Liu .......................... G06F 16/40
(Continued)

*Primary Examiner* — Khanh B Pham
*Assistant Examiner* — Brooks T Hale
(74) *Attorney, Agent, or Firm* — FINNEGAN, HENDERSON, FARABOW, GARRETT & DUNNER, LLP

(57) ABSTRACT

The present disclosure relates to a system and method for generating an executable bot application specific to an entity. In an exemplary implementation, the proposed system receives a knowledgebase comprising a set of potential queries associated with the entity, and receives video frame responses corresponding to the potential queries, wherein each potential query is mapped to an intent. The system processes, through a machine learning model, training data comprising the set of potential queries, the video frame responses, and the intent mapped to each potential query to generate a trained model, based on which a prediction engine is configured to process an end-user query and predict an intent associated with the end-user query, and facilitate response to the end-user query based on video frame response that is mapped with the predicted intent. Using the prediction engine, the proposed system auto-generates executable bot application by the entity.

21 Claims, 11 Drawing Sheets

(51) Int. Cl.
    *G06F 40/30*         (2020.01)
    *G06N 3/044*       (2023.01)
    *G06N 5/022*       (2023.01)
    *G06N 20/20*      (2019.01)

(52) U.S. Cl.
    CPC ............. *G06N 3/044* (2023.01); *G06N 5/022* (2013.01); *G06N 20/20* (2019.01)

(56) References Cited

U.S. PATENT DOCUMENTS

| | | | |
|---|---|---|---|
| 2017/0140041 A1* | 5/2017 | Dotan-Cohen | G06F 16/335 |
| 2018/0293246 A1* | 10/2018 | Wang | G06N 5/02 |
| 2019/0139092 A1* | 5/2019 | Nomula | G06Q 30/0255 |
| 2019/0156222 A1* | 5/2019 | Emma | G06F 16/3329 |

\* cited by examiner

USE CASE 1

USE CASE 2

USE CASE 3

SYSTEM AND METHOD FOR SELF-GENERATED ENTITY-SPECIFIC BOT

FIELD OF INVENTION

The embodiments of the present disclosure generally relate to facilitating generation of response to a user query. More particularly, the present disclosure relates to a system and method for facilitating generation of one or more automated visual responses to a user query based on a machine learning based architecture.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the advancements in communications technology, in particular wireless technology such as licensed segment like GSM, EDGE, HSPA, LTE, etc. and unlicensed segment like Wi-Fi, UMA, DECT, Bluetooth, Zigbee, RFID, etc., the wireless networks (deployed with multiple access networks) provide various communication services such as voice, video, data, advertisement, content, messaging and broadcasts. Recently, not only said communication channels have grown exponentially, but the heterogeneous networks have also been developed with more reliable protocols and better communications network and consumer hardware.

Alongside, processing of the computing devices is hugely improved over the years such that the consumers have now option/s to select from multiple features such as voice calling, messaging, video calling and many other value added services initiated from native dialler applications. One of said multiple features in the smartphone device that has evolved is voice/video or any combination of multimedia call. The device has a user interface which typically includes a display with or without keypad including a set of alphanumeric (ITU-T type) keys that may be real keys or virtual keys. The user interface also comprises touch/acoustic/video components for touch/sound/video input and output, a microphone, a speaker, camera and additionally audio/video I/O ports in an accessories interface, wherein the speaker normally serves to provide acoustic output in the form of human speech, ring signals, music, etc., and the camera serves to provide video input in the form of human images, tags, attributes, etc. and the display acts as an output for images, videos, VR images and videos, etc. Further, the voice calls and the video calls are considered as important and valuable tools of communications because of the voice identification, behavior, accent, emotion and ancillary information that a user may easily and efficiently communicate in said video/voice call and message. The input on the smart phones may be provided in terms of any short cut keys for making the desired command or through an intelligent integrated conversational interface (ICI). In addition to short keys available for initiating the calls, the users have an option to engage the integrated conversational interface (ICI) in a form of conversational dialog (example speech command). Said conversation interface can be implemented via existing third party applications such as Google Voice application, Nuance application, Diction application, etc. Said voice enabled assistance feature can be implemented using various different platforms such as device APIs, the web, email, etc. to provide the speech command for dialling/messaging the contacts as stored in the personal contact list of the user device. Yet another feature available to the users includes a personal assistant (intelligent personal assistant (IPA) or virtual personal assistant (VPA)) that is considered as an intelligent evolution of services to meet the ever increasing demands for mobility and connectivity. The IPA provides assistance to the users by answering questions in natural language, making recommendations, and performing actions/services based on user's inputs (including voice, vision (images), and contextual assistance). These applications are primarily based on two complementary technologies i.e. voice recognition and artificial intelligence. Therefore, the IPA enables the users to optimize the user resources (time, cost) and enhance overall productivity by minimizing interruptions in regular workflow.

In the last few decades, entities/organizations have been marketing their products by online means wherein there exists a facility for the users/customers to do an online textual chat with a bot for getting text based responses for various queries that any user may have about products/operational services provided by such entities. However, such textual response may not be informative or elaborate and may not provide an accurate response to the user query. In contrast, a video based response such as a video recording that may pictorially demonstrate the relevant information related to the user query can be far more effective. As an example, a user of a mutual fund may want to know about returns of a fund, and in such case, a textual reply may not suffice. The user would be better informed in seeing a graph and how to interpret it which a video based response may be more effective. As another example, a text based chat bot implemented by an automobile garage can only inform of the equipment available on the premises, however, displaying a video of the equipment may provide a better feel of the facilities that are available in that garage. Further, textual assistance may not be ideal in scenarios wherein a suggestion or recommendation may be needed by a user.

However, existing/conventional technologies lack virtual multimedia contact in the user device that may be used to invoke a virtual multimedia bot to avail multiple services by the users. In particular, the conventional technologies fail to invoke a virtual multimedia contact through any interface or any input that may be one of (i) any special key (numbers, character, symbols or combination of any) in the native dialer; (ii) touch command; and (iii) intelligent conversational interface (ICI) voice command. Also, the conventional technologies facilitate only voice based IPA and therefore, lack visual interactivity with the user in real time as well as user interaction with an avatar/personal assistant. Therefore, the conventional technologies restrict the user from experiencing a real time multimedia video call with a visual personal assistant bot system. Further, the conventional techniques face various other challenges while activating the IPA/VPA (through keys or interfaces). One of said challenges is meeting user's expectations in providing prompt and high quality customer-in services, since said conventional techniques are dependent on customer executives who, without knowing the problems, attempt to solve the user's queries and concerns by manually looking into all the parameters, thereby resulting in delayed response. Another challenge lies in user experience management (UEM) that has become a fundamental tool for network operators, especially for mobile network operators. Yet another challenge lies in prioritising the customer's issues and concerns, and consequently provide an optimized solution. Therefore, the conventional techniques are incapable of providing virtual multimedia contact bot and a unique bot invocation method i.e. the conventional techniques are incapable to facilitate user interaction with the avatar/personal assistant. As a result, the conventional techniques fail to provide solutions to user's queries through a video response (via personal assistance/avatar).

Additionally, generating such automated video response includes creation of video bots that may involve huge expenses as an entity/organization may need to hire an expert/specialist to enable the creation of bots due to limited professional knowledge in the field. Further, such recording may be limited to certain languages and also recording each time in a video studio may not be cost-effective for businesses. This may discourage the entities from employing such a facility that can impact the awareness of the operational services offered by the entity. Also, at the user end, a very limited information may be available by text based chat bots that can limit the choice/knowledge of product before acquiring it.

There is therefore a need in the art to provide a system and a method that can facilitate self-generation of entity/user specific bots that can be customized with one or more entity-specific automated visual responses to user queries, and at the same time are computationally convenient and time-efficient for generation, without requirement of any external help/vendor and at the same time ensuring that effective/informative responses are transmitted to end-user queries for enhanced user experience.

OBJECTS OF THE PRESENT DISCLOSURE

Some of the objects of the present disclosure, which at least one embodiment herein satisfies are as listed herein below.

It is an object of the present disclosure to enable self-generation of an entity-specific bot.

It is an object of the present disclosure to enable generation of a do-it-yourself (DIY) entity-specific bot by an entity to generate contextual responses to end-use queries.

It is an object of the present disclosure to provide a system and a method for facilitating generation of one or more automated visual responses to an end-user query.

It is an object of the present disclosure to provide a system and a method for enabling an entity to implement as well as customize visual responses that are generated to an end-user query based on their requirements, without the need to hire an expert/professional assistance.

It is an object of the present disclosure to provide a system and a method that can provide a platform to an end-user for getting, from an entity-specific bot, automated visual/video frame responses to a query regarding one or more operational services provided by an entity.

It is an object of the present disclosure to provide a system and a method for enhancing user experience, while also empowering the entity to effectively convey information related to the attributes of one or more operational services/products to the user.

SUMMARY

This section is provided to introduce certain objects and aspects of the present invention in a simplified form that are further described below in the detailed description. This summary is not intended to identify the key features or the scope of the claimed subject matter.

In an aspect, the proposed system is configured to generate an executable bot application specific to an entity, wherein the system comprises a processor that executes a set of executable instructions that are stored in a memory, upon which execution, the processor causes the system to receive, from a database, a knowledgebase comprising a set of potential queries associated with the entity, and receive video frame responses corresponding to each of the set of potential queries, wherein each of the potential queries is mapped to an intent that is selected from a plurality of intents. The system is further caused to process, through a machine learning (ML) model of the system, training data comprising the set of potential queries, the video frame responses corresponding to each of said set of potential queries, and the intent that is mapped to each of the set of a potential queries to generate a trained model. The system further generates, using the trained model, a prediction engine configured to process an end-user query and predict, from the plurality of intents, an intent associated with the end-user query, and facilitate response to the end-user query based on video frame response that is mapped with the predicted intent; and auto-generate, using the prediction engine, the executable bot application by said entity.

In an aspect, the end-user query can be received at client side of the executable bot application in the form of a first set of data packets from an end user computing device, and wherein the video frame response that is mapped with the predicted intent can be transmitted in real-time in the form of a second set of data packets to said end user computing device from server side of the executable bot application. In another aspect, the client side of the executable bot application can be represented in the form of any or a combination of an animated character, a personality character, or an actual representation of the entity character.

In another aspect, the predicted intent can be determined by the prediction engine based on any or a combination of context of the end-user query, pre-stored mapping between words that form part of the end-user query and synonymous and theoretical words stored in the knowledgebase, semantic similarity between the end-user query and the set of potential queries, syntactic similarity between the end-user query and the set of potential queries, and weight of each word that forms part of the end-user query.

In another aspect, the video frame responses can be manually recorded by the entity using a recording device, wherein the manual recording is done based on successful authentication of the entity.

In yet another aspect, the ML model can be configured to pre-processes the knowledgebase for any or a combination of data cleansing, data correction, synonym formation, proper noun extraction, white space removal, stemming of words, punctuation removal, feature extraction, and special character removal, wherein the data pertains to the set of potential queries associated with the entity and corresponding video frame responses.

In another aspect, the ML model can include a long term short term memory (LSTM) based model having culmination of logistic regression model and neural network based bi-directional LSTM cells, wherein the knowledgebase is used to train LSTM neural net using categorical cross entropy as loss function and an optimizer, wherein the ML model facilitates supervised learning. Each layer of the LSTM neural net can be configured to extract information during the training to minimize loss function and to retrain one or more weights of the respective layer. In an exemplary implementation, the lowest layer of the LSTM neural net can be passed to logistic regression (LR) to create sentence vectors from the set of potential queries, wherein the sentence vectors acting as input for the LR to calculate probabilities for each intent can be mapped to a potential query such that the system estimates an output including the intent with highest probability. During evaluation of the output, assessment can be performed by the prediction engine based on a predetermined set of rules that screen through any or a combination of a pre-defined salutation and one or more attributes associated with the end-user query such that if the assessment indicates a negative response, the end-user query is converted into a mathematical representation of expressions using the trained model to identify a relevant intent associated with the end-user query for providing the output, wherein the prediction can be done to estimate the predicted intent with highest probability in a manner that the video frame response that is mapped with the predicted intent is transmitted.

In an aspect, the entity can incorporate an ability to add a new potential query to the set of potential queries and associate a corresponding video frame response to said new potential query, based on which the trained model is updated. In another aspect, the entity can incorporate an ability to edit an existing potential query from the set of potential queries and associate a new or edited or the same corresponding video frame response to said edited potential query, based on which the trained model is updated.

In an aspect, one video frame response can be mapped to more than one potential queries. Similarly, more than one video frame responses can be mapped to a potential query. In another exemplary implementation, more than one intents can be mapped to a potential query. Similarly, the ML model can be selected from a plurality of ML models based on the knowledgebase that is to be processed for generating said trained model. As would be appreciated, the entity may be any or a combination of a legal entity or a natural person.

The present disclosure further provides for a method for generating an executable bot application specific to an entity, wherein the method comprises the steps of: receiving, from a database, a knowledgebase comprising a set of potential queries associated with the entity, and receiving video frame responses corresponding to each of the set of potential queries, wherein each of said potential queries is mapped to an intent that is selected from a plurality of intents; processing, through a machine learning (ML) model of the system, training data comprising the set of potential queries, the video frame responses corresponding to each of the set of potential queries, and the intent that is mapped to each of the set of a potential queries to generate a trained model; generating, using the trained model, a prediction engine configured to process an end-user query and predict, from the plurality of intents, an intent associated with the end-user query, and facilitate response to the end-user query based on video frame response that is mapped with the predicted intent; and auto-generating, using the prediction engine, the executable bot application by the entity.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
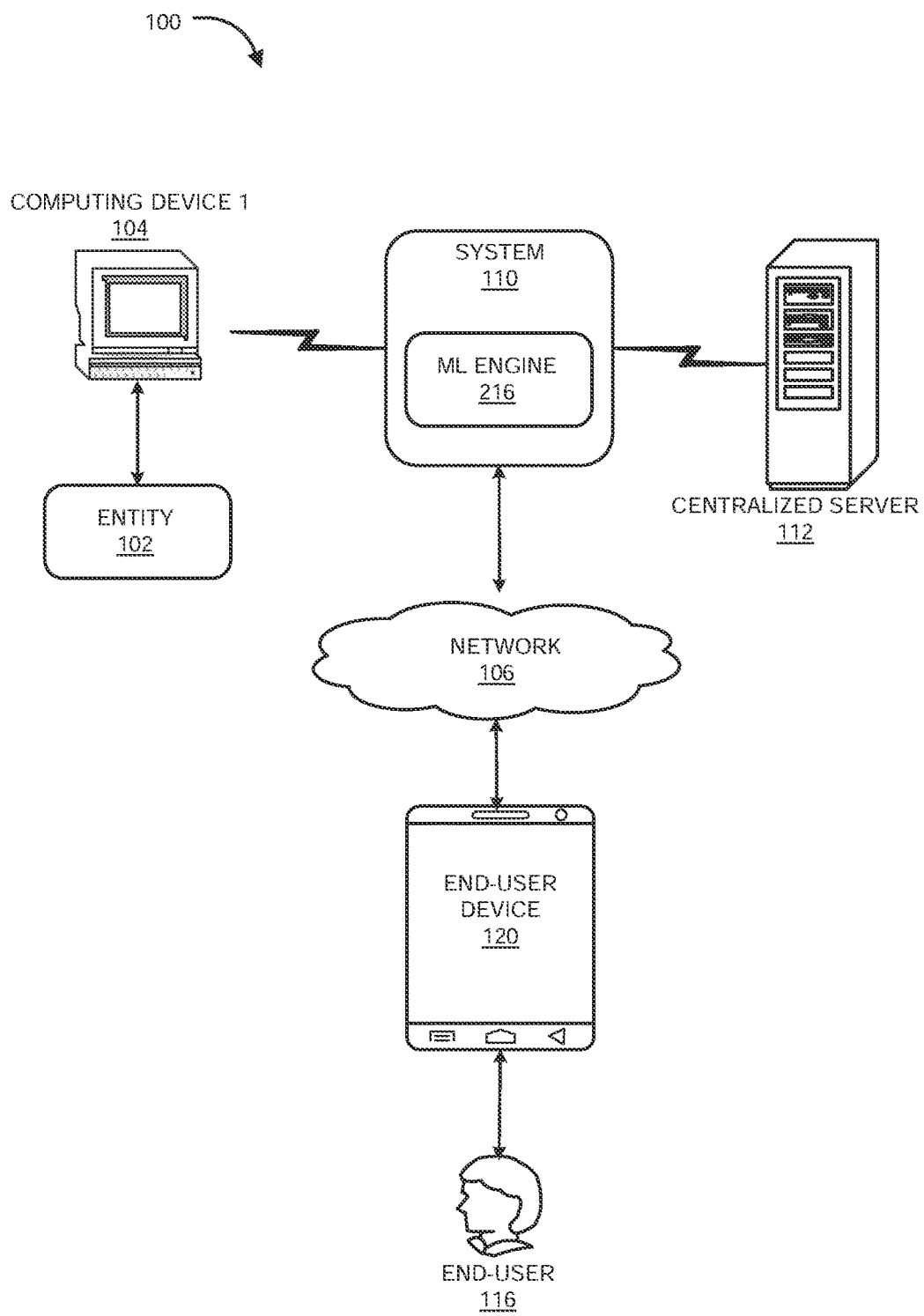
FIG. 1 illustrates an exemplary network architecture (100) in which or with which the system of the present disclosure can be implemented for self-generation of entity-specific bot, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present invention provides a robust and effective solution to an entity or an organization by enabling them to implement a system for generating automatic visual responses without getting help from an expert/professional assistance as well as ability to customize responses to any queries that may be asked by users using their devices, wherein the queries may be related to one or more aspects of operational services/goods of the entity. Particularly, the system and method may empower an entity to pre-record/pre-store predefined responses in the database to enable generation of automated visual responses to a user query based on machine learning architecture, which allows the entity or organizations to customize the information and responses as per their requirements. Conventional textual responses may be limited in information and may not be informative enough for a user. The system and method of the present invention assists users to obtain visual responses to their queries to ensure more informative, relevant response and enhanced user experience than conventionally provided textual responses. Further, the accuracy and precision of the machine learning based system is relatively higher than the conventional systems that may not provide a proximate or accurate response to user queries. Thus, the system and method of the present disclosure may be beneficial for both entities and users.

Referring to FIG. 1 that illustrates an exemplary network architecture (100) in which or with which system (110) of the present disclosure can be implemented, in accordance with an embodiment of the present disclosure. As illustrated, the exemplary architecture (100) includes a system (110) equipped with a machine learning (ML) engine (216) for facilitating self-generation/instantiation of an entity-specific bot that can generate one or more automated visual responses to an end-user query based on machine learning architecture. The visual responses may be related to one or more occupational services associated with the entity (102). In an embodiment, the entity (102) may be an organization, an individual or a group of individuals offering the operational services such as a celebrity, a consultant, a start-up, a mid-sized company, a manufacturing entity, among other like entities or professionals or any self-individual person. The system (110) can empower the entity (102) to self-generate a do-it-yourself bot that can customize the visual responses (also interchangeably referred to as video frame responses) that are automatically generated, as per the needs and requirements of the entity (102). To achieve this, the entity (102) may provide requisite predefined visual responses by using their respective computing device (104) such that the responses are provided based on the nature, context, and type of one or more pre-defined (also interchangeably referred to as potential) queries that may be related to occupational/professional/business services/goods of the entity. The system may include a bot engine (212) (refer to FIG. 2) that can receive/process, from a database such as from a centralized server (112), a knowledgebase comprising a set of potential queries associated with the entity (102) along with receiving video frame responses corresponding to each of the set of potential queries, wherein each of the potential queries can be mapped to an intent (also interchangeably referred to as category or classification) that can be selected from a plurality of intents. The system may further include a machine learning (ML) engine (216) that can be configured to process, through an appropriately selected machine learning (ML) model of the system, training data comprising the set of potential queries, the video frame responses corresponding to each of said set of potential queries, and the intent that is mapped to each of the set of a potential queries to generate a trained model. The trained model can then be used to generate a prediction engine (214) configured to process an end-user query and predict, from the plurality of intents, an intent associated with the end-user query, and facilitate response to the end-user query based on video frame response that is mapped with the predicted intent. Using the prediction engine, the desired executable bot application can be automatically generated. In an aspect, the end-user query may be received at client side of the executable bot application in the form of a first set of data packets from an end user computing device (120), wherein the video frame response that is mapped with the predicted intent can be transmitted in real-time in the form of a second set of data packets to said end-user computing device (120) from server side (112) of the executable bot application.

In another aspect, the bot engine (212) can enable generation of a plurality of datasets, wherein each dataset may include one or more pre-defined visual responses to a pre-defined/potential query. In an embodiment, the pre defined visual responses may be generated by the entity (102) using the computing device (104) based on one or more requirement criteria. The system (110) may be associated with a centralized server (112). The ML engine (216) may be provided an input including the pre-defined queries and the corresponding video frame responses/datasets to enable a learning phase of the ML engine (216). The system (110) can further communicate with an end-user device (120) via a network (106), wherein the end-user device (120) may be associated with an end-user (116). The end-user (116) may ask a end-user query using his/her computing device (120), wherein based on the end-user query and intent/category/classification that said query is processed/mapped to, the system (110) may generate one or more visual responses.

The system (110) of the present disclosure can enable entity (102) to customize the pre-defined visual responses in a manner that may best suit the needs of the entity (102) for enhanced awareness of the operational services offered by them. In an embodiment, the pre-defined visual responses (input) and the automated visual responses (output) may include any or a combination of responsive video frames and visual display of information including, but not limited to, graphical data and images that may be informative with respect to the pre-defined query. In an exemplary embodiment, the responsive video frames may be video recording that may be manually recorded using a recording device coupled to a computing device of the entity. The recording device can be any or a combination of a camera, a video recorder and the like that may be either inbuilt or externally connected to the computing device (104) of the entity (102). The recording device may further include one or more audio recording accessories connected thereto. The entity may record the responsive video frames based on a list of pre-defined/potential queries, wherein length of the recording can be reviewed and modified by the entity. In exemplary embodiment, if the entity is an organization, the responsive video frames may be recorded by one or more operators associated with the entity (102). Thus, using the implementation of the present disclosure, an entity can record videos anywhere and does not require the recording to be done in specific studios. In embodiment, the manual recording may be done based on an authentication of an identity of the entity or one or more operators associated with the entity (102), such that only if the authentication may be positive, the entity or the operator may allowed to manually record the responsive video frames. Based on positive authentication, the computing device (104) may be communicably coupled via interface of the system (110) such that bot engine of the system (110) may receive the pre-defined visual responses through an interface of the system (110).

In an embodiment, the requirement criteria for generation of the predefined visual/video frame responses can include at least one factor associated with the pre-defined query selected from relevancy of information, theoretical information, information related to the availability of one or more products corresponding to the operational services and a recommendation corresponding the operational services. In an exemplary embodiment, the entity (102) may desire to generate pre-defined response based on the relevancy of information, wherein the relevancy can depend on the qualitative information that may be essential explain a particular pre-defined query. The theoretical information may be related to the existing general information in relation to the pre-defined query. The information related to the availability of one or more products correspond to the operational services that may include data which may be specific to the type and variety of products that the entity might be offering. The recommendation corresponding to the operational services may include an opinion or a perspective that may highlight which products may be more suited for a specific set of users. Thus, the present system can enable a wide variety of responses and hence can be far more effective as well as informative.

In accordance with an embodiment and as illustrated in FIG. 1, on the end-user end, the architecture can enable an end-user or a group of end-users to access information regarding the operational services offered by the entity by typing an end-user query (hereinafter interchangeably referred to as query/queries) on their respective computing devices (120) and obtaining a visual response for the end-user query. In an embodiment, the end-user may include, but not limited to, an existing customer, a potential customer, a research analyst, or any other person interested to know about the operational services offered by the entity. In an embodiment, the end-user query may be received in form of a first set of data packets from an end-user device associated with the user, wherein the generated automated visual responses may be transmitted to the end-user device in real time in form of a second set of data packets, upon receipt of the end-user query.

In an embodiment, the computing device (104) and/or the user device (120) may communicate with the system (110) via set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

Figure 2:
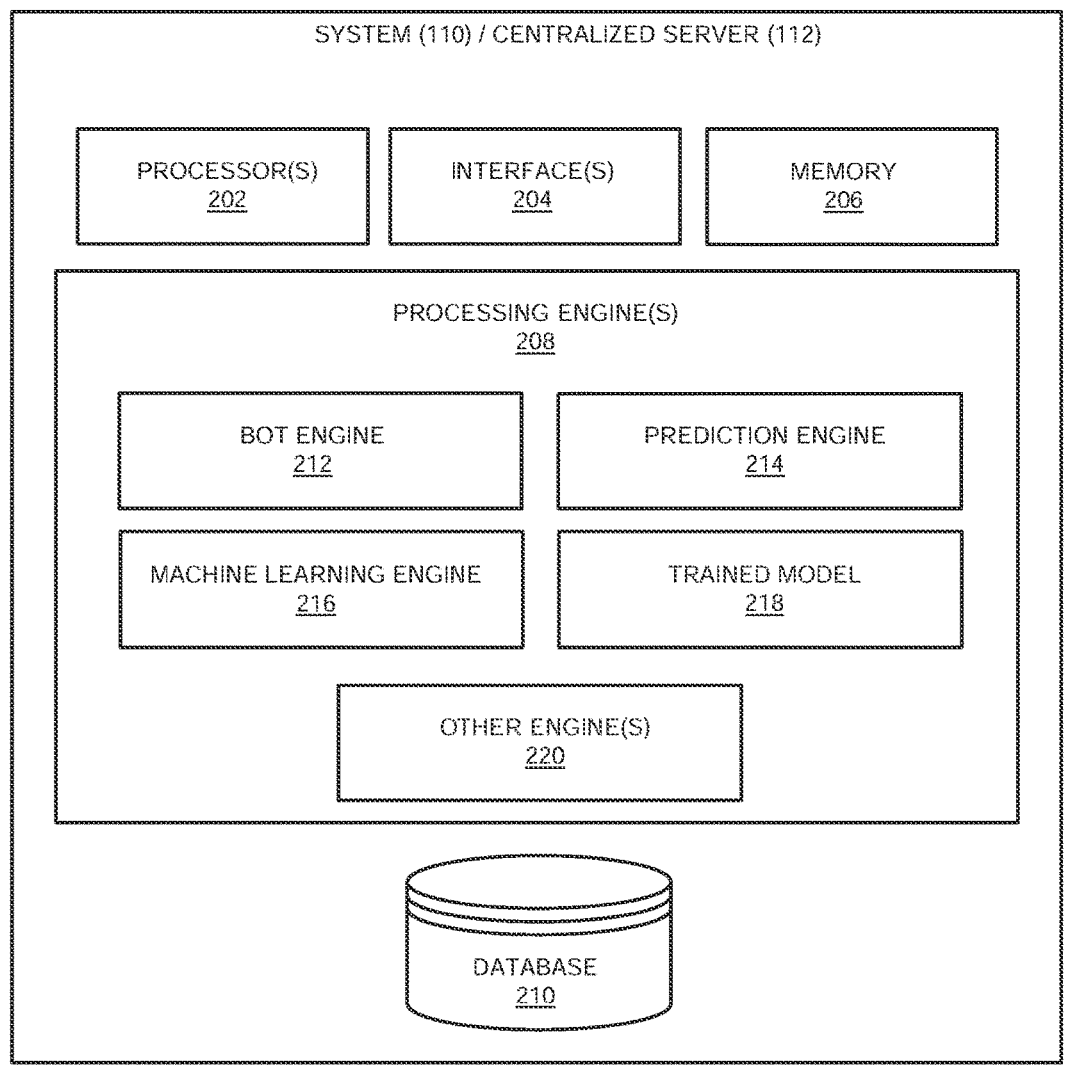
FIG. 2 illustrates an exemplary representation (200) of system (110) or a centralized server (112) for self-generation of entity-specific bot, in accordance with an embodiment of the present disclosure.

In an embodiment, the system (110) may include one or more processors coupled with a memory, wherein the memory may store instructions which when executed by the one or more processors may cause the system to perform the generation of automated visual responses to a query. FIG. 2 with reference to FIG. 1, illustrates an exemplary representation of system (110)/centralized server (112) for facilitating self-generation of an entity-specific bot through which one or more automated visual responses to an end-user query are transmitted based on a machine learning based architecture, in accordance with an embodiment of the present disclosure. In an aspect, the system (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (206) of the system (110). The memory (206) may be configured to store one or more computer-readable instructions or routines in a non-transitory computer readable storage medium, which may be fetched and executed to create or share data packets over a network service. The memory (206) may comprise any non-transitory storage device including, for example, volatile memory such as RAM, or non-volatile memory such as EPROM, flash memory, and the like.

In an embodiment, the system (110)/centralized server (112) may include an interface(s) 204. The interface(s) 204 may comprise a variety of interfaces, for example, interfaces for data input and output devices, referred to as I/O devices, storage devices, and the like. The interface(s) 204 may facilitate communication of the system (110). The interface (s) 204 may also provide a communication pathway for one or more components of the system (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110)/centralized server (112) may comprise the machine-readable storage medium storing the instructions and the processing resource to execute the instructions, or the machine-readable storage medium may be separate but accessible to the system (110)/centralized server (112) and the processing resource. In other examples, the processing engine(s) (208) may be implemented by electronic circuitry.

The processing engine (208) may include one or more engines selected from any of a bot engine (212), a prediction engine (214), a machine learning (ML) engine (216), learning module (218), and other engines (220). In an embodiment, the bot engine (212) of the system (110) can receive/process/pre-process a knowledgebase (retrieved say from a database or a storage medium) including, but not limited to, one or more potential queries that the entity (attempting to make the bot) is likely to be asked along with video frame responses to each of the one or more potential queries, wherein each query is associated/mapped with an intent/category/classification that reflects the purpose/intent behind the query. The bot engine also enables generation of plurality of datasets based on one or more pre-defined visual/video frame responses and pre-defined/potential queries received from the computing device (104) of the entity (102). The bot engine can receive pre-defined visual responses from the computing device (104) through an interface of the system, wherein the bot engine (212) may generate plurality of dataset based on the pre-defined visual responses and categorically store them in a database (210) based on prestored parameters associated with each pre-defined query.

In an embodiment, the pre-stored parameters may include any or a combination of a subject of the pre-defined query, semantic similarity between multiple pre-defined queries, syntactic similarity between the multiple pre-defined queries and type of the operational services of the entity. In an embodiment, each dataset may be associated with an expression and an intent corresponding to the expression, wherein the intent may define a relevant category for the expression. The expression may include one or more visual attributes associated with each predefined visual response.

In an embodiment, prior to processing, the proposed system may include a query processing engine may preprocess any of the pre-defined/potential query or an end-user query, wherein the pre-processing may be done for data correction or attribute extraction. In an exemplary embodiment, the pre-processing can include any or a combination of synonym formation, proper noun extraction, white space removal, stemming of words, punctuation removal and special character removal. The pre-processing may ensure cleaning of data before the actual processing may be done by the ML engine (216), either in the learning phase or in the prediction phase, which would further enhance the accuracy and precision of prediction.

In an aspect, the ML engine (216) can be configured to process, through a machine learning (ML) model of the system, training data comprising the set of potential queries, the video frame responses corresponding to each of the set of potential queries, and the intent that is mapped to each of the set of a potential queries to generate a trained model (218). The system accordingly uses the trained model (218) to generate a prediction engine (214) that may be configured to process an end-user query and predict, from the plurality of intents, an intent associated with the end-user query, and facilitate response to the end-user query based on video frame response that is mapped with the predicted intent; and auto-generate, using the prediction engine, the executable bot application by the entity.

In an aspect, the end-user query can be received at client side of the executable bot application in the form of a first set of data packets from an end user computing device, and wherein the video frame response that is mapped with the predicted intent can be transmitted in real-time in the form of a second set of data packets to said end user computing device from server side of the executable bot application. In another aspect, the client side of the executable bot application can be represented in the form of any or a combination of an animated character, a personality character, or an actual representation of the entity character.

In another aspect, the predicted intent can be determined by the prediction engine based on any or a combination of context of the end-user query, pre-stored mapping between words that form part of the end-user query and synonymous and theoretical words stored in the knowledgebase, semantic similarity between the end-user query and the set of potential queries, syntactic similarity between the end-user query and the set of potential queries, and weight of each word that forms part of the end-user query.

In another aspect, the video frame responses can be manually recorded by the entity using a recording device, wherein the manual recording is done based on successful authentication of the entity.

In yet another aspect, the ML model can be configured to pre-processes the knowledgebase for any or a combination of data cleansing, data correction, synonym formation, proper noun extraction, white space removal, stemming of words, punctuation removal, feature extraction, and special character removal, wherein the data pertains to the set of potential queries associated with the entity and corresponding video frame responses.

In an aspect, the entity can incorporate an ability to add a new potential query to the set of potential queries and associate a corresponding video frame response to said new potential query, based on which the trained model is updated. In another aspect, the entity can incorporate an ability to edit an existing potential query from the set of potential queries and associate a new or edited or the same corresponding video frame response to said edited potential query, based on which the trained model is updated.

In an aspect, one video frame response can be mapped to more than one potential queries. Similarly, more than one video frame responses can be mapped to a potential query. In another exemplary implementation, more than one intents can be mapped to a potential query. Similarly, the ML model can be selected from a plurality of ML models based on the knowledgebase that is to be processed for generating said trained model. As would be appreciated, the entity may be any or a combination of a legal entity or a natural person.

Once the entity-specific bot has been created/generated, in an exemplary implementation, prior to evaluation by the ML engine to predict output to an end-user query, the query processing engine may process the end-user query to enable extraction of one or more features associated with the end-user query and assessment of the extracted features based on predetermined set of rules to facilitate the prediction by the ML engine. In an embodiment, assessment by the query processing engine may be based on the predetermined set of rules and may include screening through any or a combination of a pre-defined salutation and one or more attributes associated with the input data, wherein if the assessment indicates a negative response, the end-user query may be converted into one or more mathematical representation of expressions using the trained model (218) to identify a relevant intent associated with the end-user query for providing the output. During such evaluation or prediction, an output intent with highest probability is estimated using trained model (218) such that based on the prediction of the output intent, visual responses corresponding to the predicted intent are generated and transmitted by the system (110) to the end-user.

In an embodiment, the ML engine (216) may be associated with a learning phase and a prediction phase. In a learning phase, the machine learning (ML) engine of the system can process an input data including pre-defined/potential query and the corresponding dataset/video frame response(s). In an embodiment, the input data may be processed through the trained model (218) associated with the ML engine (216), wherein the processing may include extraction of one or more attributes associated with each potential query and each corresponding dataset/video frame response to train the trained model (218). In an embodiment, the extracted attributes may include expressions and the relevant intent of the expressions. In an exemplary implementation, ML model associated with the ML engine (216) can pre-process the knowledgebase for any or a combination of data cleansing, data correction, synonym formation, proper noun extraction, white space removal, stemming of words, punctuation removal, feature extraction, and special character removal, wherein the data pertains to the set of potential queries associated with the entity and corresponding video frame responses. The ML model can include, but is not limited to, a long term short term memory (LSTM) based model having culmination of logistic regression model and neural network based bi-directional LSTM cells, wherein the knowledgebase can be used to train LSTM neural net using categorical cross entropy as loss function and an optimizer, wherein the ML model facilitates supervised learning. In an aspect, each layer of the LSTM neural net can extract information during the training to minimize loss function and to retrain one or more weights of the respective layer. In another exemplary aspect, lowest layer of the LSTM neural net can be passed to logistic regression (LR) to create sentence vectors from the set of potential queries, wherein the sentence vectors can act as an input for the LR to calculate probabilities for each intent mapped to a potential query such that the system estimates an output including the intent with highest probability. During evaluation of the output, assessment can be performed by the prediction engine based on a predetermined set of rules that screen through any or a combination of a pre-defined salutation and one or more attributes associated with the end-user query such that if the assessment indicates a negative response, the end-user query is converted into a mathematical representation of expressions using the trained model to identify a relevant intent associated with the end-user query for providing the output, wherein said prediction is done to estimate the predicted intent with highest probability in a manner that the video frame response that is mapped with the predicted intent is transmitted.

Figure 3A:
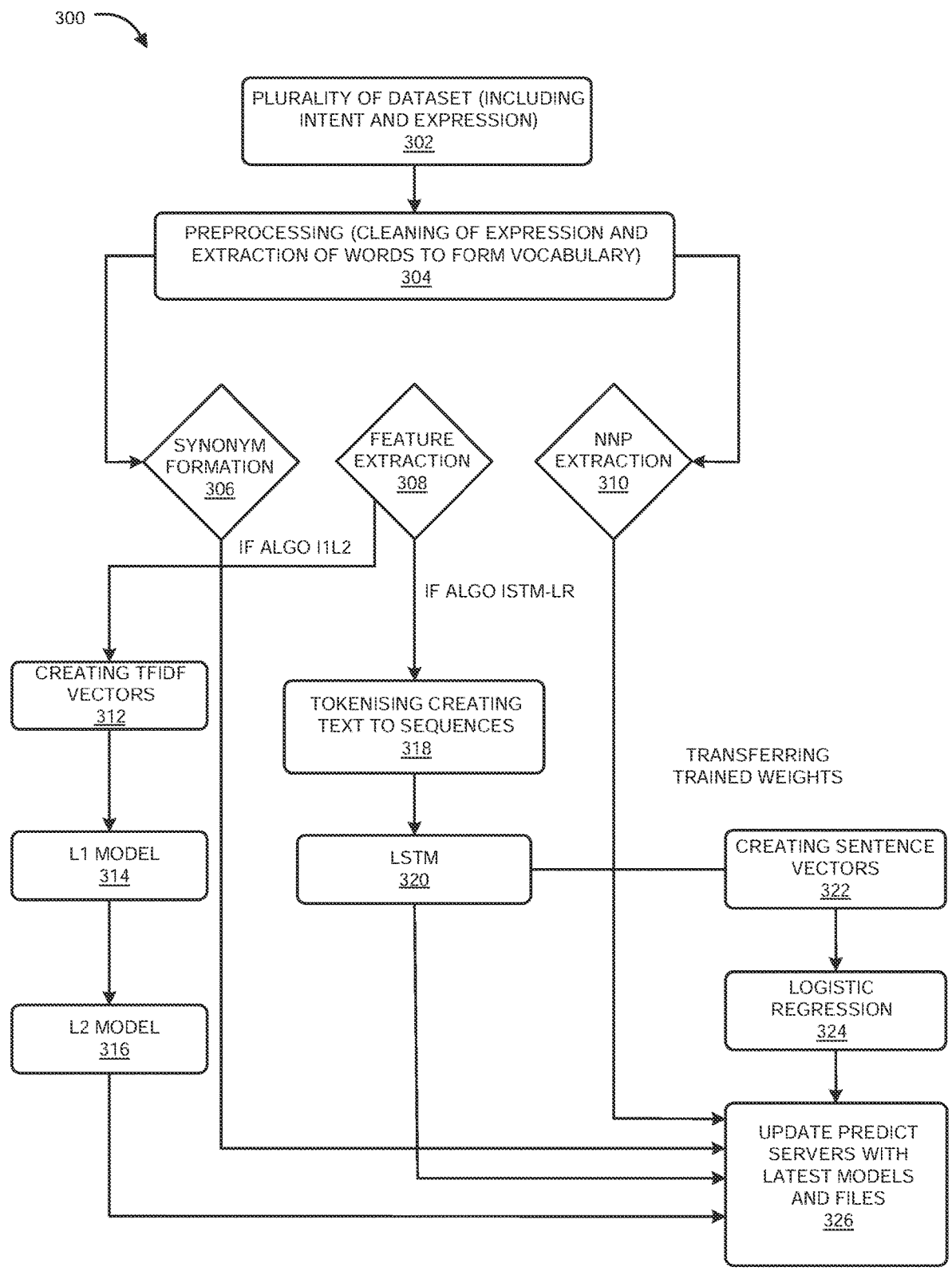
FIG. 3A illustrates an exemplary flow diagram (300) representation depicting learning phase associated with a machine learning engine of system (110), in accordance with an embodiment of the present disclosure.

FIG. 3A illustrates an exemplary flow diagram representation (300) depicting, as part of the process for generation of an entity-specific bot, learning phase associated with a machine learning engine, in accordance with an embodiment of the present disclosure. At 300, an input data including a plurality of dataset (including intent and expressions) and pre-defined query may be received, wherein the bot engine of the system enables generation of the datasets based on predefined visual responses received from computing device of entity. At 304, the received input data may be pre-processed for cleaning of expression and extraction of words to form vocabulary. The LSTM model may include neural network with several layers, wherein each layer may extract some information or features (308) during training to minimize the loss function and retrain the weights of the layer. If LSTM-LR model may be used then the text may be converted to sequences (318) and the lowest layer of this neural network may be passed to Logistic Regression (LR) which creates sentence vectors from the expressions (322, 324), wherein sentence vectors may act as input for LR which may use a sigmoid function to calculate the probabilities for each class and returns the class which has the highest probability. If another algorithm (L1L2) may be used, then Term Frequency-Inverse Document Frequency (TFIDF) (312) may be employed for creating vectors to transform text into a meaningful representation of numbers using L1 model (314) and L2 model (316). As shown in FIG.

3A, algorithm L1L2 may also provisioned in the same service which may be primarily used for voice-based bots. Along with training models, as mentioned earlier several other Knowledge base specific files may be created for synonym formation (306) (variations of a word in the training set to increase the vocabulary of the train set) and NNPs extraction (310) (proper nouns in the training set for enhancing the results of the predictions related to the Knowledge base), which are integral part of the trained learning module. Based on this, the learning module may be trained and servers may be updated with latest model and files (datasets) (326).

Figure 3B:
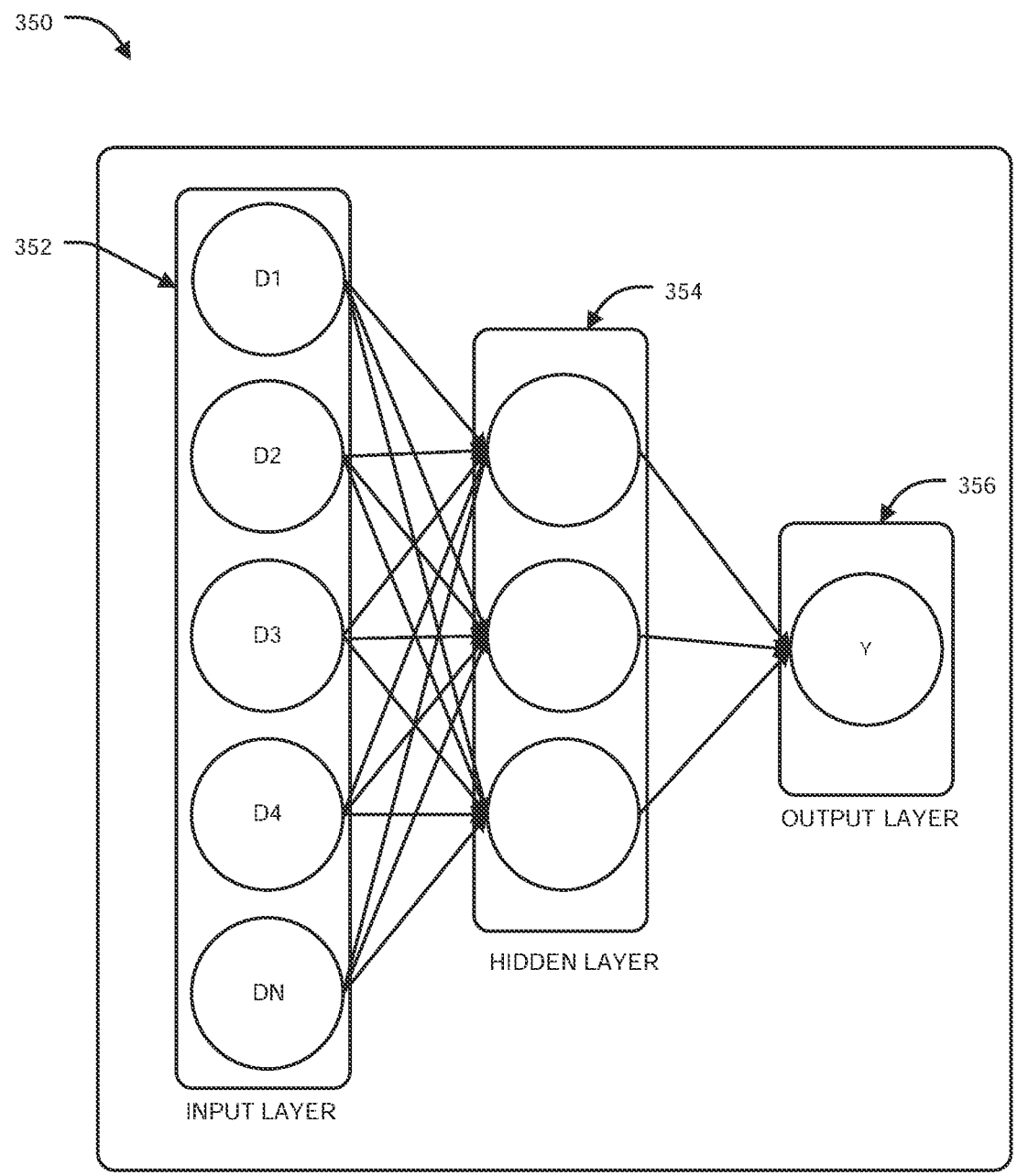
FIG. 3B illustrates an exemplary representation (350) depicting an artificial neural network associated with a machine learning (ML) engine (216) of system (110), in accordance with an embodiment of the present disclosure.

In an exemplary embodiment, the neural network associated with a machine learning (ML) engine (216) of system (110) may include multiple layers, as shown in an exemplary representation (350) in FIG. 3B. In an embodiment, the neural network (350) may include neurons (represented as circles), wherein the neural network may have three basic layers including input layer (352) (D1, D2, D3 . . . Dn), hidden layer (354) and output layer (356) (Y). In an exemplary embodiment, the input data including the pre-defined query and plurality of dataset (knowledge Base) may be used to Train the LSTM neural network using categorical cross entropy as a loss function and Adam optimizer, wherein the learning phase is a supervised learning task, in which both the input and the output are provided to the model while training, wherein each layer may extract some information during training to minimize the loss function and retrain the weights of the layer for enhancing accuracy and precision.

In an exemplary embodiment, the plurality of datasets may be stored in the database in form of a knowledge base such that the knowledge base may include all information about one or more types of requirements associated with the operational services of the entity. The dataset may contain expressions and their relevant categories or classes called Intents, wherein based on such a dataset (list of intents and expressions) created for the knowledge base, an algorithm may be selected and the learning module may be trained with the algorithm using the knowledge base/dataset may be trained. This may generate a model that can be used for prediction (intent classification) using the trained learning module. In an embodiment, based on the intent returned by the trained learning module for a new expression, a response may be selected by the system (110) based on mapping of the intent stored in the database, which may be then sent to the end-user device (120) in real time. In an embodiment, prior to learning phase, pre-processing may be done for data cleaning and feature extraction process that may be ancillary processes such as synonym formation, proper noun extraction, white space removal, stemming of words, punctuation removal, special character removal and the like, which can enable the training and predictions to be more accurate. Once the model is trained, all the files created during Training are pushed to the trained learning module.

In the prediction phase, the ML engine (216) of the system (110) may generate an output in response to an end-user query received by the system (110), wherein the output may be in form of one or more automated visual responses based on prediction by the trained learning module of the ML engine. In an embodiment, in the prediction phase, the end-user query may be processed by a query processing engine of the system (110) to enable extraction of one or more features associated with the end-user query and assessment of the extracted features based on predetermined set of rules to facilitate the prediction by the ML engine. In an embodiment, the assessment by the query processing engine based on the predetermined set of rules can include screening through any or a combination of a pre-defined salutation and one or more attributes associated with the input data, wherein if the assessment indicates a negative response, the user query may be converted into one or more mathematical representation of expressions using the trained learning module to identify a relevant intent associated with the user query for providing the output. In an embodiment, the output is mainly related to an estimated Intent, in which case, an end-user query is fed as an input to a machine learning model and it returns an intent which helps in understanding and contextualizing the user query and performing suitable actions on them.

Figure 4:
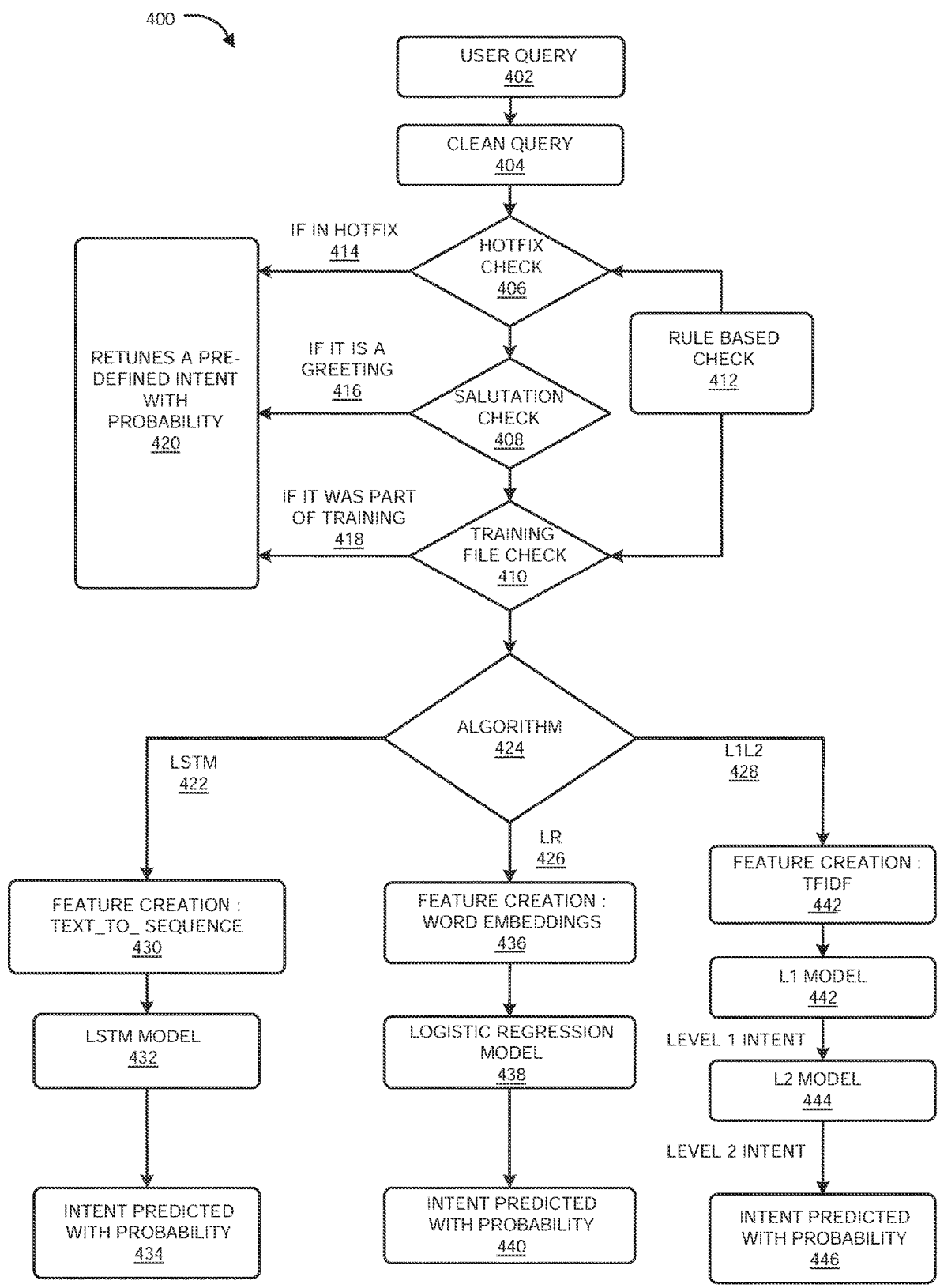
FIG. 4 illustrates an exemplary flow diagram (400) depicting steps in prediction of an output, in accordance with an embodiment of the present disclosure.

FIG. 4 illustrates an exemplary flow diagram (400) depicting components of the system architecture involved in generation of an entity-specific bot and prediction of an output to an end-user query through the bit, in accordance with an embodiment of the present disclosure. At 402, as part of generation of the trained model and further generation of the prediction engine, an end-user query may be received, wherein the end-user query may be pre-processed or cleaned at query processing engine of the system (110) as shown in 404. Several rule-based checks/assessment can be placed before the model prediction, wherein the end-user query may be checked to identify if the query is associated with any specific situation (Hotfix check, 406), salutation check (greeting check, 408) or any training file check (one or more attributes associated with the input data/datasets). The Hotfix check may be to provide instant solution to regular/specific situation related to the end-user query. The greetings check may be associated to common everyday greetings and training file check may relate to checking if the end-user query may be present exactly in the expression related to the datasets provided at the time of training/learning phase. If the assessment may be positive, which means that the end-user query is found in any of these checks, the system (110) returns the specific intent with highest probability. In an embodiment, if the assessment may be negative i.e. if the response for an end-user query is not found in any of these checks, the end-user query may be converted to features (mathematical representation of expressions which are fed to the model for training) using the same feature extraction technique employed for the algorithm while training (as shown in 422, 424 and 426). For each algorithm, a pre-defined feature extraction technique may be selected and the cleaned query may then be converted using the model specific feature extraction, wherein based on pre-defined configuration for the specific knowledge base, an algorithm is selected, such that the models return a class with a probability which helps in determining model's confidence. The trained model (218) (or trained learning module) may then return the intent as output which may be sent to prediction engine (214) for further processing and sending the visual response to the user device of the user. This classification process for newer expressions may be a predictive process that uses mathematical model and returns an intent or class that the new expression could possibly belong, thus enabling an understanding and contextualizing the user query to perform suitable actions on them. In an embodiment, the ML platform may be utilized as a BAAS or Bot-As-A-Service platform.

Figure 5A:
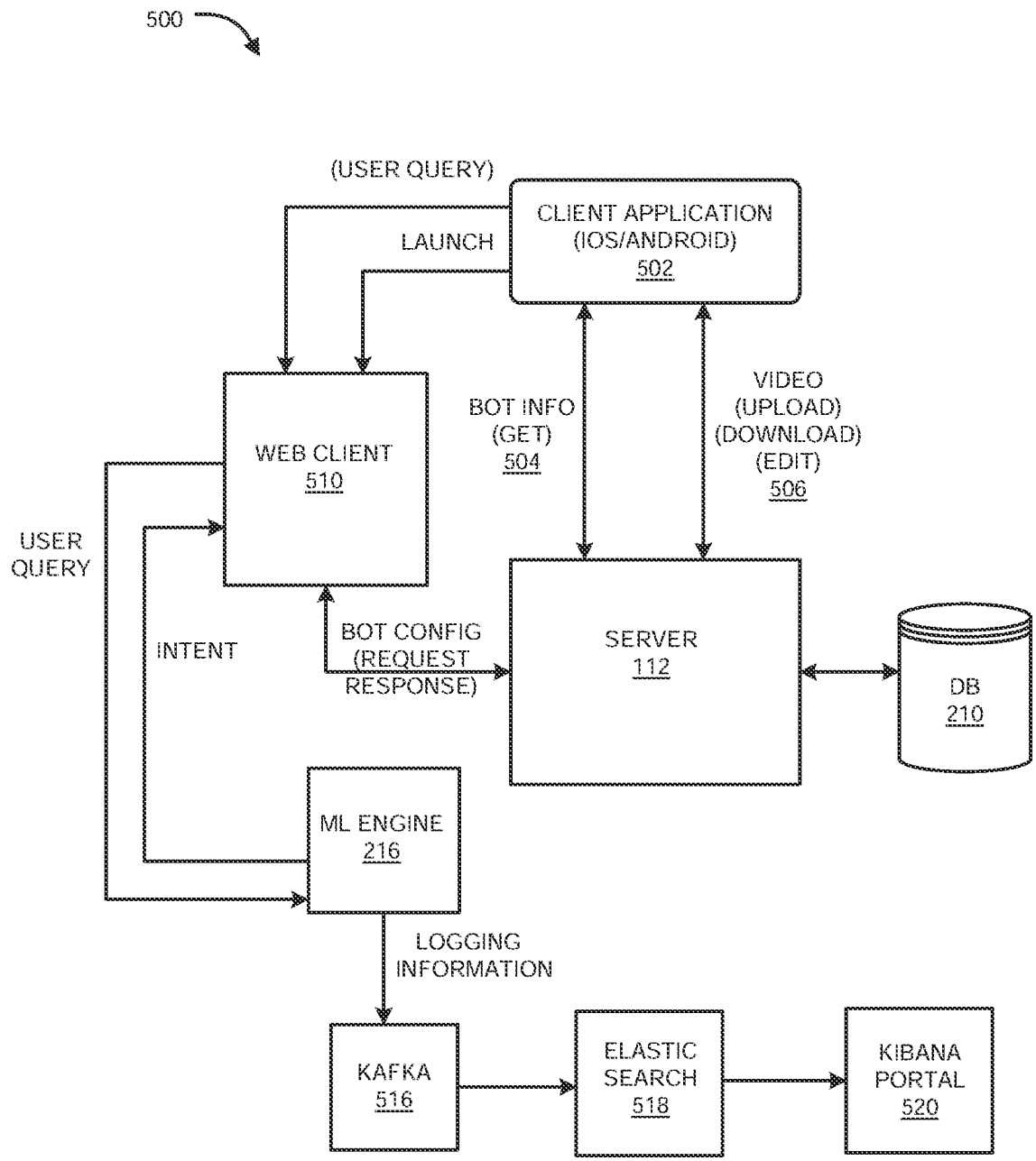
FIGS. 5A and 5B illustrate exemplary representations for an exemplary overview of the system architecture and its implementation, in accordance with an embodiment of the present disclosure.

FIG. 5A illustrates a representation (500) for an exemplary overview of the system architecture and its implementation, in accordance with an embodiment of the present disclosure. As shown in FIG. 5, the system architecture may include an interface (502) that may be associated with the computing device of entity having Android™ and IOS™, which can make a server call to fetch list of questions with respect to a particular Bot (automated visual response), wherein the entity may record videos for a particular predefined query and save it. The system architecture may further include server (112) that may send a list of potential queries with respect to a particular bot for a particular entity to the interface (502). The recorded videos by the entity may be saved on the server and the information may maintained for the Bot (prediction) in the database. The system can also generate an intent file, video collection file and trending questions file, which contains the mapping of the intent with the respective video (potential query to which the video frame response caters), which may be sent to a web client (510), wherein in order to initialize the Bot (automated visual response), a web client makes a call to the server to obtain all the information to start the bot. This information pertains to the Intent file, Video collection file and trending question file. The system architecture may further include database (210), wherein details of entity, Bots, questions, videos and topics may be stored with a time stamp. The ML engine (216) of the system may have a task to identify the intent for any given expression, wherein each expression (of a dataset/potential query) may be passed through the ML engine and a probability may be calculated for that intent across the entire class of intents such that the highest probability may be calculated for an intent for any given expression, which may be taken as the primary or contextual intent for that expression. The system architecture may further include Kafka (516), which is a streaming platform to maintain a queue of expressions that contain information about the prediction done by the ML engine; an Elastic Search (518) that is used for Monitoring and dashboarding purposes and a Kibana portal (520).

Figure 5B:
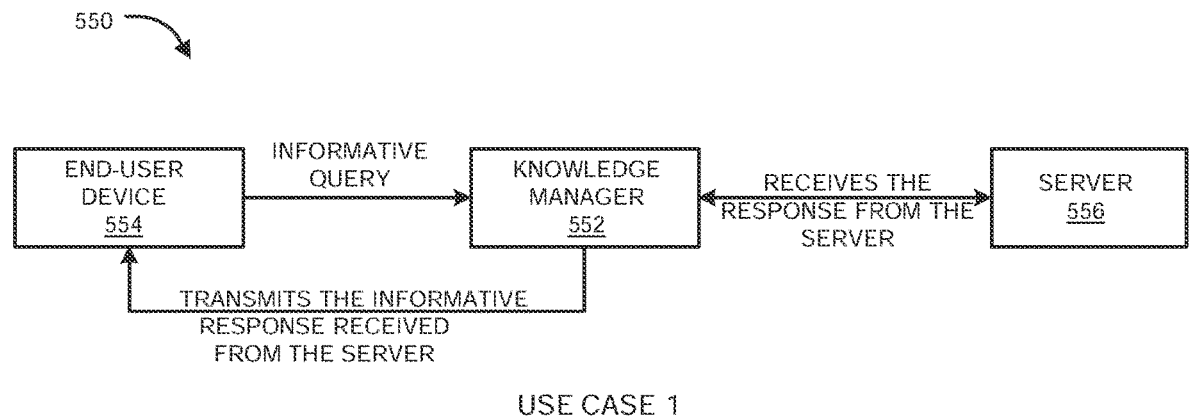
Figure 5B:
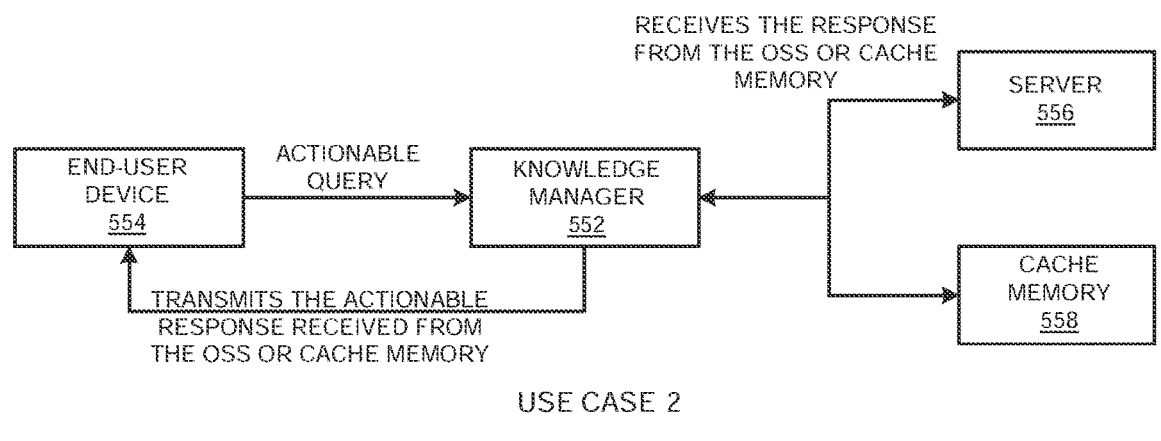
Figure 5B:
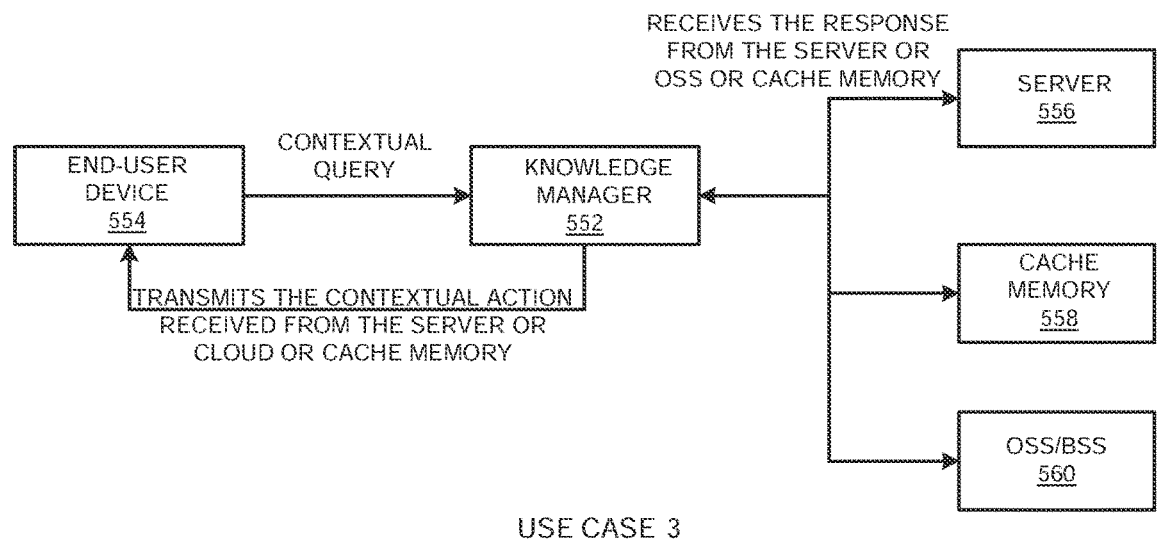

FIG. 5B illustrates exemplary use cases for providing video frame responses for multiple exemplary end-user queries in accordance with the embodiments of the present disclosure. In Use Case 1 where a video frame response may be determined (based on the intent predicted by the prediction engine based on attributes/parameters associated with the end-user query) as informative response by a knowledge manager (552) based on an informative end-user query, communication unit may be configured to communicate the at least one video frame response (say from server or database/cloud (556)) to the end-user on the end-user device (554) i.e. providing the required information to the end-user using the client-side interface [552] of the knowledge manager/entity-specific bot.

In Use Case 2 where the at least one video frame response may be determined as the actionable response by the knowledge manager (552) based on the actionable query, the knowledge manager (552) may be configured to perform the requisite action/service (executing a specific action for e.g. connecting the user with the network operator) pursuant to communication with at least one of the at least one server (556) and the cache memory (558) and subsequently, the communication unit may be configured to communicate/notify the user about the execution of the requisite action/service by the knowledge manager.

Further, Use Case 3 illustrates an exemplary scenario where the at least one response may be determined as the Contextual response by the knowledge manager (552) based on the contextual query, wherein the contextual response may be determined in two exemplary scenarios. In first exemplary scenario where the at least one end-user query is "please play video of xyz song", the knowledge manager (552) may first check if the strength of the mobile tower located in the vicinity of the end-user device (554) is sufficient for playing the video song. In an event the strength of the mobile tower is not sufficient, the visual assistant may be configured to communicate with the user and inform that the "the video song cannot be played due to weak signal strength". In second exemplary scenario where the at least one user query is "what is the balance", the knowledge manager (552), using the visual assistant, may ask the user the specific type of service for which the balance is required for e.g. data balance, voice balance, etc. On receiving the instructions from the user, the knowledge manager (552) may process the information and may communicate with at least one of the at least one server (556), the OSS/BSS (560) and the cache memory (558). Accordingly, the communication unit may communicate with the user and inform the user that "your balance is 2GB" using the entity-specific bot.

Figure 6:
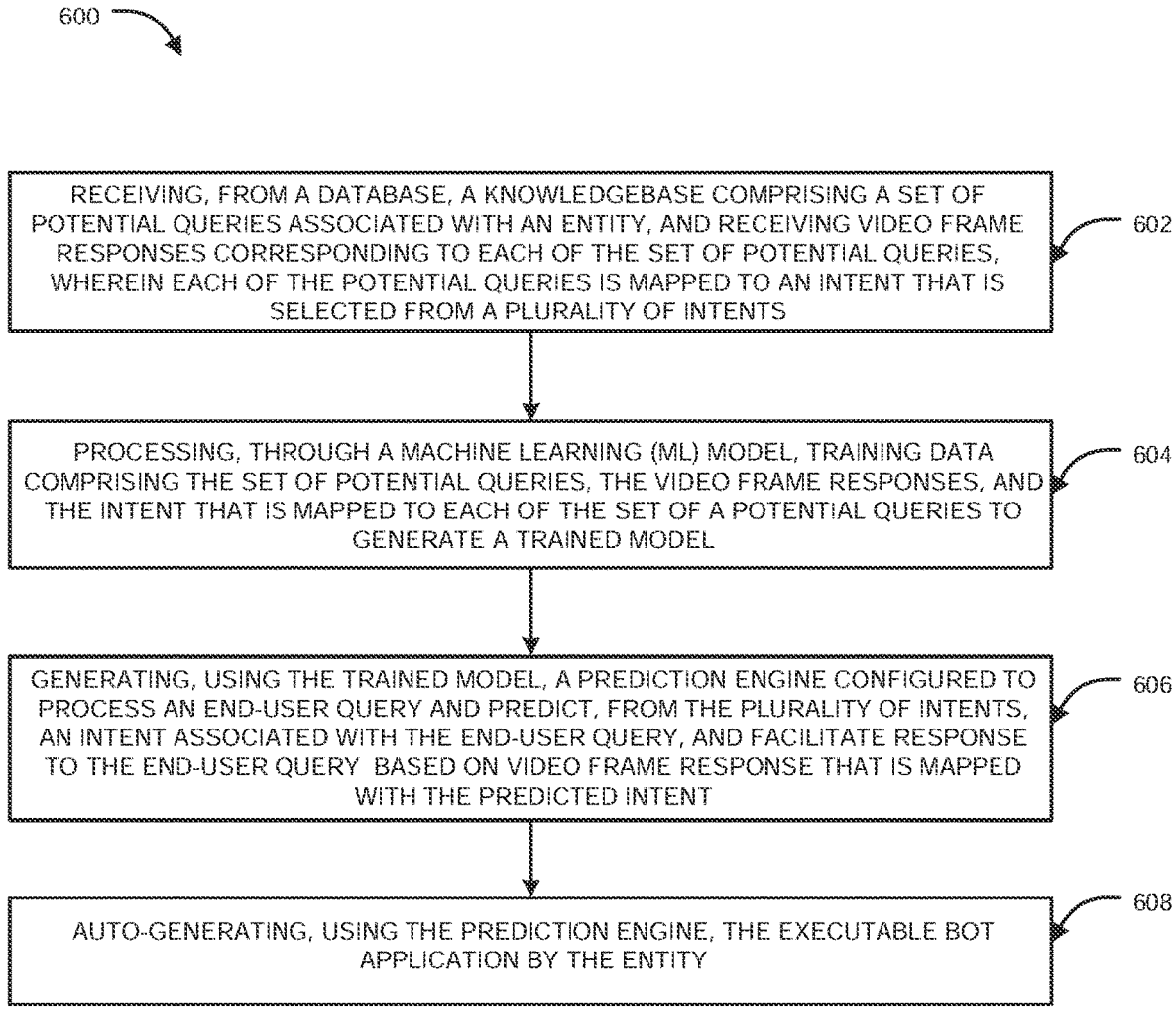
FIG. 6 illustrates exemplary method flow diagram (600) depicting a method for facilitating generation of one or more automated visual responses to a user query, in accordance with an embodiment of the present disclosure.

FIG. 6 illustrates exemplary method flow diagram (600) depicting a method for generating an executable bot application specific to an entity, wherein the method comprises the steps of, at step 602, receiving, from a database, a knowledgebase comprising a set of potential queries associated with the entity, and receiving video frame responses corresponding to each of the set of potential queries, wherein each of said potential queries is mapped to an intent that is selected from a plurality of intents; at step 604, processing, through a machine learning (ML) model of the system, training data comprising the set of potential queries, the video frame responses corresponding to each of the set of potential queries, and the intent that is mapped to each of the set of a potential queries to generate a trained model; at step 606, generating, using the trained model, a prediction engine configured to process an end-user query and predict, from the plurality of intents, an intent associated with the end-user query, and facilitate response to the end-user query based on video frame response that is mapped with the predicted intent; and at step 608, auto-generating, using the prediction engine, the executable bot application by the entity.

Figure 7A:
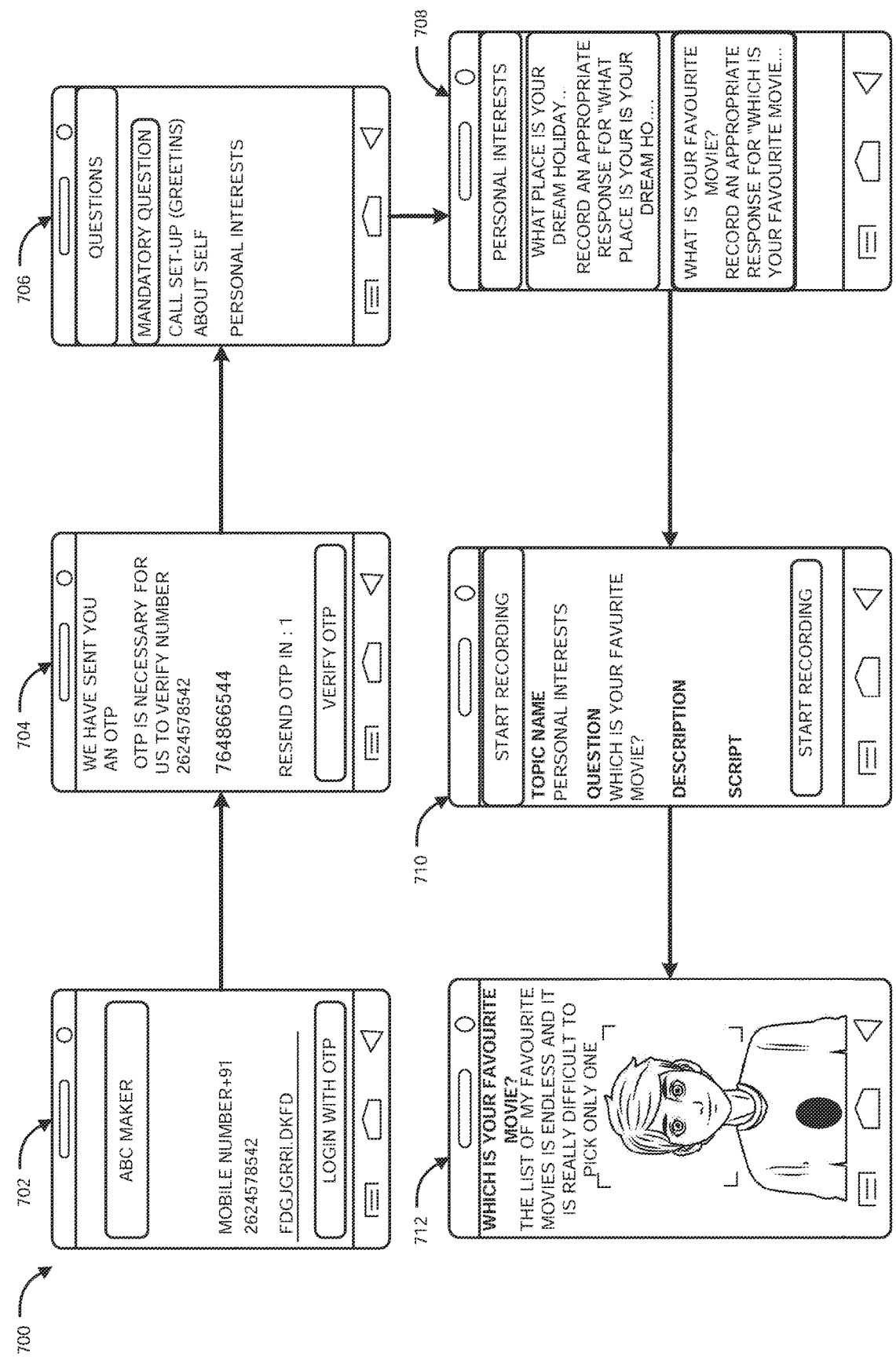
FIGS. 7A-7B illustrates a representation (700 and 750) of the exemplary working of the system (110) and method (400), in accordance with embodiments of the present disclosure.
Figure 7B:
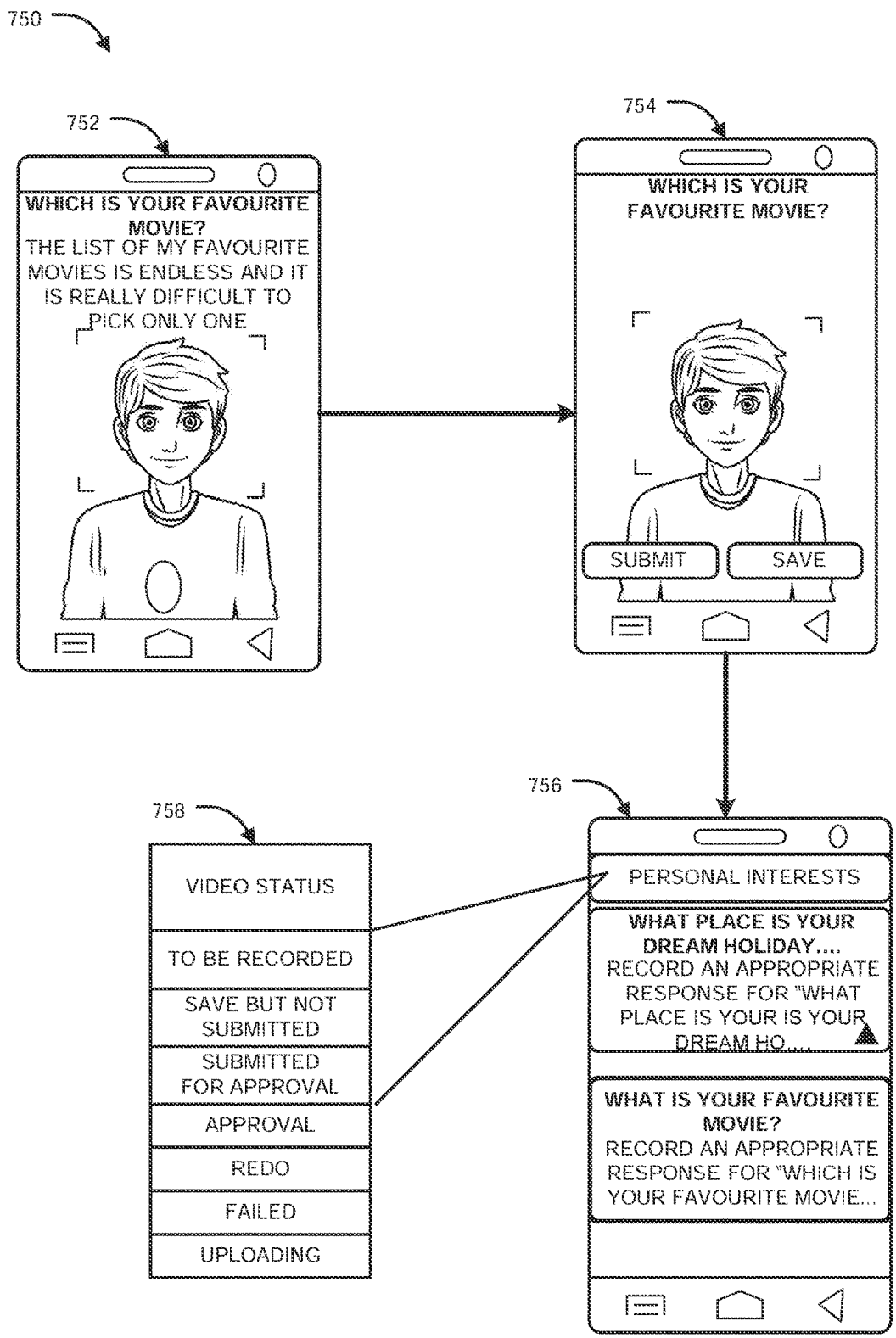

FIGS. 7A-7B illustrates a representation (700 and 750) of the exemplary working of the system (110) and method (600), in accordance with embodiments of the present disclosure. As illustrated in FIG. 7A, an entity may launch a bot using computing device by providing details such as input mobile number, name in the format of first name and last name, and a login option for authentication via one-time password (as shown in 702 and 704). After logging in, a homepage may be displayed with a selection module, upon which selection, a questions category screen may appear that can enable the entity to create and upload video for predefined queries (as shown in 706). Upon clicking a question category, a list of predefined/potential queries (such as related to topic of personal interests) may appear (as shown in 708). Further, at 710, entity (or an operator associated with the entity) may initiate recording of video by clicking "Start Recording Button", wherein the screen may display predefined query, its topic, description, and its script, wherein the description enables the entity to understand what needs to be done and the script may be a response script which the user can use to record the video. Upon pressing the central bottom circular button (black oval shaped button as shown in 712), the recording can be initiated wherein the query and a textual response may also be displayed. As illustrated in FIG. 7B, a similar display as 712 is shown, wherein after recording the video, the entity can view it and if acceptable can submit (as shown in 754). The interface also enables to delete any video and/or to record another time to make a new one. In an embodiment, if the entity wishes to upload any existing video from the computing device or from another source/network, it may be possible as well. Once recorded video is saved/submitted, an icon can change indicating that the recording is complete (as shown by triangular shaped icon in 756), wherein the interface may provide an information button to assist the entity (or operator) to know the meaning of all the status icons, wherein an exemplary status and version information display is provided in 758. The entity (or operator) can view all the recorded videos in the recorded section. Finally, after recording mandatory videos & successfully submitting, the user can view the Bot and upon clicking on the Bit can check the visual response-based experience.

Figure 8:
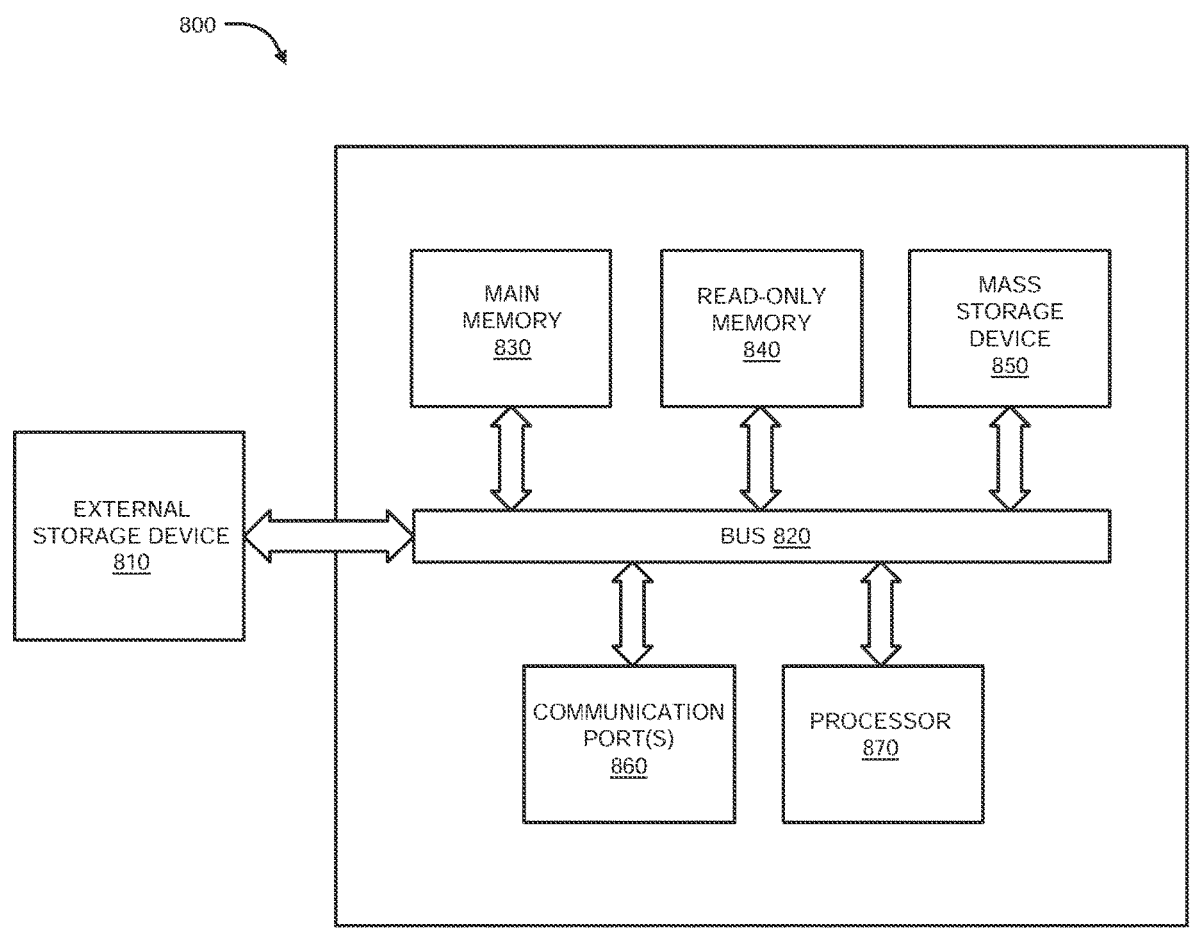
FIG. 8 refers to the exemplary computer system (800) in which or with which embodiments of the present invention can be utilized, in accordance with embodiments of the present disclosure.

FIG. 8 illustrates an exemplary computer system in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 870 may include various modules associated with embodiments of the present invention. Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with a computer system. Other operator and administrative interfaces can be provided through network connections connected through communication port 860. The external storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for facilitating generation of one or more automated visual responses to a user query based on a machine learning based architecture, thus providing an automated and improved user experience solution. The solution offered by the present disclosure ensures that the response generation is accurate/precise due to the involvement of well-trained ML engine. Further, other benefits include quick go-to-market strategy for those entity/organizations that do not wish to expend excessive time in developing and managing the technology as the system of the present disclosure is a ready to implement solution with no special training in ML and without need for a professional expert/ knowledge. The present disclosure can lead to huge cost savings by way of studio costs in recording queries and responses, otherwise required conventionally. Further, the recording of the videos can be done at leisure and using a background that is most appropriate for the promotion activity. It is important to realize that the system is easy to use, has ability to re-record videos should there be a change in the content requirement, ability to record with different models/speakers, ability to support multiple languages, is highly scalable, allowing the users to enhance the scope of coverage, if needed. The system further also benefits the user/customer by way of checking videos about operational service by the user before he/she takes a decision on the services being promoted and also allows the end user of the promotion to choose the questions he/she wants information on, rather than be given information which may not be of interest. The technical advantages of the present disclosure also includes an ability of the technology to cater to all languages, easy-to-use Interface, the system caters to both Android, Kai OS and IOS and the like, scalability of the technology allows the customers to enhance the scope of coverage needed to promote additional services and products, the ability of the bot to play Video, Voice and Text equally well in Traditional Telephony Networks (1800s) and OTT web environment (Apps, Websites) via OTT SDK.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

We claim:

1. A system for generating an executable bot application specific to an entity, said system comprising a processor that executes a set of executable instructions that are stored in a memory, upon which execution, the processor causes the system to:

receive, from a database, a knowledgebase comprising a set of potential queries associated with said entity, and receive video frame responses corresponding to each of said set of potential queries, wherein each of said potential queries is mapped to an intent that is selected from a plurality of intents;

process, through a machine learning (ML) model of the system, training data comprising said set of potential queries, said video frame responses corresponding to each of said set of potential queries, and said intent that is mapped to each of said set of potential queries to generate a trained model, wherein the ML model pre-processes the knowledgebase for a combination of data cleansing, data correction, synonym formation, proper noun extraction, white space removal, stemming of words, punctuation removal, feature extraction, and special character removal, and wherein the data pertains to the set of potential queries associated with the entity and corresponding video frame responses;

generate, using the trained model, a prediction engine configured to process an end-user query and predict, from said plurality of intents, an intent associated with the end-user query, and facilitate a response to said end-user query based on a video frame response that is mapped with the predicted intent, wherein the predicted intent is based on a combination of context of the end-user query, pre-stored mapping between words that form part of the end-user query and synonymous and theoretical words stored in the knowledgebase, semantic similarity between the end-user query and the set of potential queries, syntactic similarity between the end-user query and the set of potential queries, and weight of each word that forms part of the end-user query;

assess, by the prediction engine, an intent with a highest probability, based on a predetermined set of rules that uses at least one of: a pre-defined salutation and one or more attributes associated with the end-user query;

upon receiving a negative response for the assessment, convert, by the trained model, the end-user query into a mathematical representation of expressions to identify a relevant intent associated with the end-user query and transmit the video frame response that is mapped with the assessed intent;

enable said entity to incorporate an ability to add a new potential query to the set of potential queries and associate a corresponding video frame response to said new potential query, based on which the trained model is updated;

enable said entity to incorporate an ability to edit an existing potential query from the set of potential queries and associate a new or an edited or the same corresponding video frame response to said edited potential query, based on which the trained model is updated; and auto-generate, using the prediction engine, the executable bot application by said entity.

2. The system as claimed in claim 1, wherein said end-user query is received at client side of the executable bot application in the form of a first set of data packets from an end user computing device, and wherein the video frame response that is mapped with the predicted intent is transmitted in real-time in the form of a second set of data packets to said end user computing device from server side of the executable bot application.

3. The system as claimed in claim 2, wherein said client side of the executable bot application is represented in the form of any or a combination of an animated character, a personality character, or an actual representation of the entity character.

4. The system as claimed in claim 1, wherein said video frame responses are manually recorded by the entity using a recording device, said manual recording being done based on successful authentication of the entity.

5. The system as claimed in claim 1, wherein the ML model comprises a long term short term memory (LSTM) based model having culmination of logistic regression model and neural network based bi-directional LSTM cells.

6. The system as claimed in claim 5, wherein the knowledgebase is used to train a LSTM neural net using categorical cross entropy as a loss function and an optimizer, wherein the ML model facilitates supervised learning.

7. The system as claimed in claim 6, wherein each layer of the LSTM neural net extracts information during the training to minimize the loss function and to retrain one or more weights of the respective layer.

8. The system as claimed in claim 7, wherein the lowest layer of the LSTM neural net is passed to logistic regression (LR) to create sentence vectors from the set of potential queries, said sentence vectors acting as input for the LR to calculate probabilities for each intent mapped to a potential query such that the system estimates an output including the intent with highest probability.

9. The system as claimed in claim 1, wherein one video frame response is mapped to more than one potential queries.

10. The system as claimed in claim 1, wherein more than one video frame responses are mapped to a potential query.

11. The system as claimed in claim 1, wherein more than one intents are mapped to a potential query.

12. The system as claimed in claim 1, wherein the ML model is selected from a plurality of ML models based on the knowledgebase that is to be processed for generating said trained model.

13. The system as claimed in claim 1, wherein said entity is any or a combination of a legal entity or a natural person.

14. A method for generating an executable bot application specific to an entity, said method comprising the steps of:

receiving, from a database, a knowledgebase comprising a set of potential queries associated with said entity, and receiving video frame responses corresponding to each of said set of potential queries, wherein each of said potential queries is mapped to an intent that is selected from a plurality of intents;

processing, through a machine learning (ML) model of a system, training data comprising said set of potential queries, said video frame responses corresponding to each of said set of potential queries, and said intent that is mapped to each of said set of potential queries to generate a trained model, wherein the ML model pre-processes the knowledgebase for a combination of data cleansing, data correction, synonym formation, proper noun extraction, white space removal, stemming of words, punctuation removal, feature extraction, and special character removal, and wherein the data pertains to the set of potential queries associated with the entity and corresponding video frame responses;

generating, using the trained model, a prediction engine configured to process an end-user query and predict, from said plurality of intents, an intent associated with the end-user query, and facilitate a response to said end-user query based on a video frame response that is mapped with the predicted intent, wherein the predicted intent is based on a combination of context of the end-user query, pre-stored mapping between words that form part of the end-user query and synonymous and theoretical words stored in the knowledgebase, semantic similarity between the end-user query and the set of potential queries, syntactic similarity between the end-user query and the set of potential queries, and weight of each word that forms part of the end-user query;

assessing, by the prediction engine, an intent with a highest probability, based on a predetermined set of rules that screen through any or a combination of a pre-defined salutation and one or more attributes associated with the end-user query;

based on the assessment indicating a negative response, converting, by the trained model, the end-user query into a mathematical representation of expressions to identify a relevant intent associated with the end-user query and transmit the video frame response that is mapped with the assessed intent;

enabling said entity to incorporate an ability to add a new potential query to the set of potential queries and associate a corresponding video frame response to said new potential query, based on which the trained model is updated;

enabling said entity to incorporate an ability to edit an existing potential query from the set of potential queries and associate a new or an edited or the same corresponding video frame response to said edited potential query, based on which the trained model is updated; and auto-generating, using the prediction engine, the executable bot application by said entity.

15. The method as claimed in claim 14, wherein said end-user query is received at client side of the executable bot application in the form of a first set of data packets from an end user computing device, and wherein the video frame response that is mapped with the predicted intent is transmitted in real-time in the form of a second set of data packets to said end user computing device from server side of the executable bot application.

16. The method as claimed in claim 15, wherein said client side of the executable bot application is represented in the form of any or a combination of an animated character, a personality character, or an actual representation of the entity character.

17. The method as claimed in claim 14, wherein said video frame responses are manually recorded by the entity using a recording device, said manual recording being done based on successful authentication of the entity.

18. The method as claimed in claim 14, wherein the ML model comprises a long term short term memory (LSTM) based model having culmination of logistic regression model and neural network based bi-directional LSTM cells.

19. The method as claimed in claim 18, wherein the knowledgebase is used to train LSTM neural net using categorical cross entropy as a loss function and an optimizer, wherein the ML model facilitates supervised learning.

20. The method as claimed in claim 19, wherein each layer of the LSTM neural net extracts information during the training to minimize the loss function and to retrain one or more weights of the respective layer.

21. The method as claimed in claim 20, wherein the lowest layer of the LSTM neural net is passed to logistic regression (LR) to create sentence vectors from the set of potential queries, said sentence vectors acting as input for the LR to calculate probabilities for each intent mapped to a potential query such that the system estimates an output including the intent with highest probability.

* * * * *